Patented Jan. 12, 1932

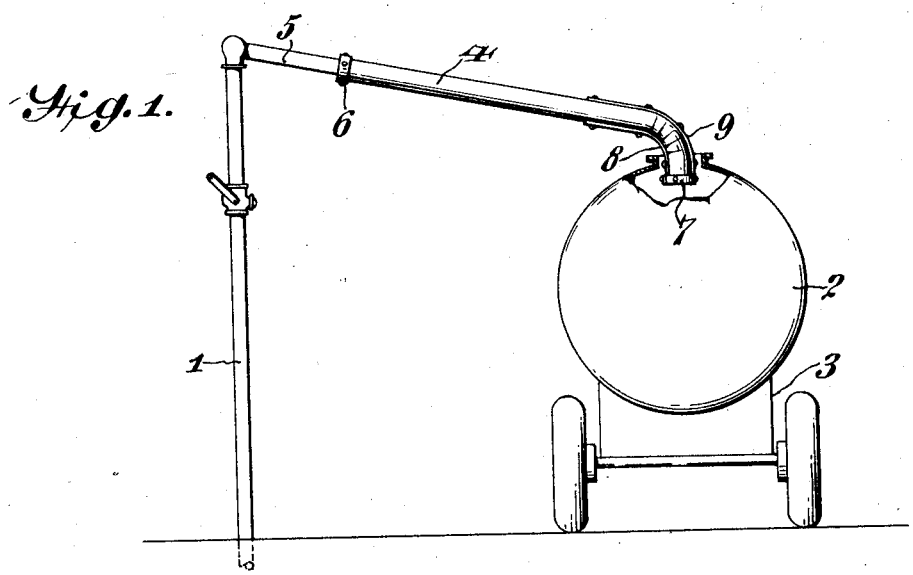
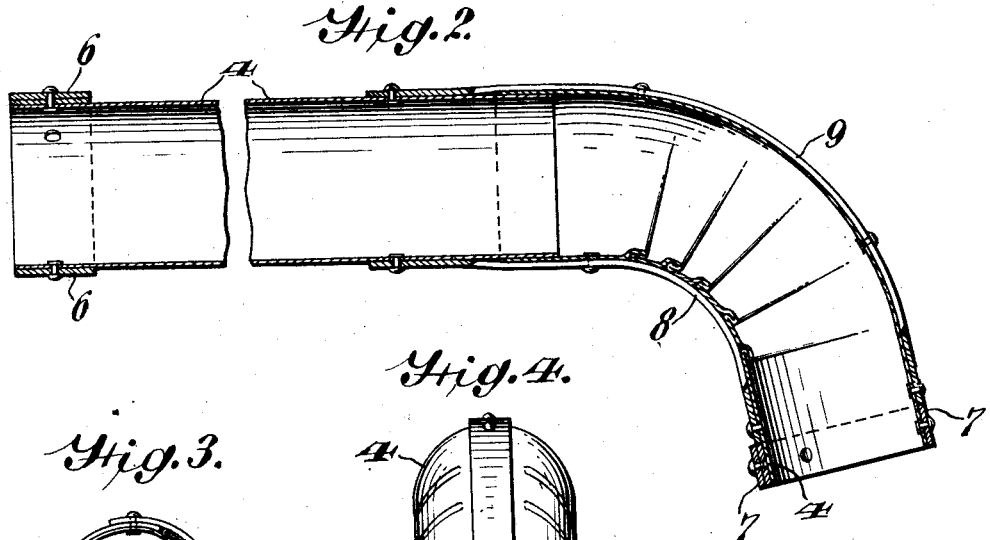
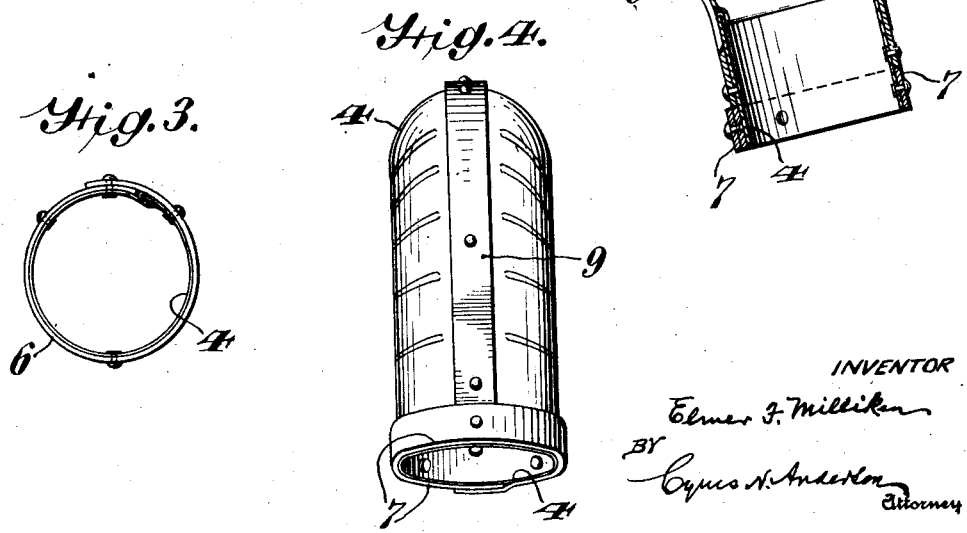

1,840,593

UNITED STATES PATENT OFFICE

ELMER F. MILLIKEN, OF ARLINGTON, MASSACHUSETTS, ASSIGNOR TO GEORGE D. ELLIS AND SONS, INCORPORATED, OF PHILADELPHIA, PENNSYLVANIA, A CORPORATION OF PENNSYLVANIA

TANK FILLING PIPE

Application filed March 26, 1931. Serial No. 525,411.

My invention relates to pipes or tubular members of suitable length for use in the filling of truck tanks, tank cars or other metal receptacles or containers with gasoline or other inflammable liquid. For example, the device may be employed for conveying the gasoline from a supply stand-pipe to a truck tank, a tank car or other receptacle; also to connect with and fit into a stationary pipe set in a compartment of a tank truck.

Heretofore pipes or tubular members of this character have consisted of galvanized sheet iron or steel and it has happened and is liable to happen at any time that the contact of iron or steel against iron or steel will produce a spark which may ignite the gasoline or fumes or vapors thereof, if any be present. It will be seen, therefore, that the use of a pipe or tubular section consisting wholly of iron or steel without protecting means for delivering gasoline or other inflammable liquids to tanks or other receptacles made of similar material should be avoided if possible. To that end I have provided a pipe or tubular member of galvanized iron, steel or other metal the opposite ends of which are provided with means for preventing the contact thereof with the similar metal of a tank or other like receptacle to thereby prevent the possibility of the producing of a spark as may happen when iron or steel strikes against iron or steel.

My invention consists in the providing of portions of metal such as brass which is softer than the iron, steel or other metal of the said pipe or tubular member and which when striking the iron, steel or other metal of a tank or other like receptacle will not result in the production of a spark. By this means safety in the handling of gasoline or other inflammable liquids to deliver it to a tank or other receptacle is greatly enhanced.

In order that the invention may be readily understood and its practical advantages fully appreciated reference should be had to the accompanying drawing wherein I have illustrated an embodiment of the invention in the form at present preferred by me, but it will be understood that the invention is susceptible of embodiment in other forms of construction than that shown and that changes in the details of construction may be made within the scope of the claims without departing from the said invention.

In the drawings:

Fig. 1 is a view in side elevation of a pipe or tubular member provided with means embodying by invention, the said pipe or tubular member being shown in use for delivering gasoline or other inflammable liquids from a standpipe to a tank mounted upon a truck, the said tank and truck being shown in outline in end elevation;

Fig. 2 is a view in longitudinal section of the pipe or tubular member shown in Fig. 1;

Fig. 3 is a view in end elevation of the pipe looking from the left toward the right in Fig. 2; and Fig. 4 is a similar view looking from the right toward the left in Fig. 2.

In the drawings I have shown a stand-pipe 1 having connection with a source of gasoline or other inflammable liquid, and a tank 2 supported upon a truck 3, to which tank the gasoline or other liquid is adapted to be supplied through a pipe or tubular member 4 provided with the means embodying my invention. The outer or receiving end of the pipe 4 is connected with the outer or delivery end of a tubular spout 5 connected at its opposite end with the stand-pipe 1. The pipe or tubular member 4 usually consists of sheet iron or steel which preferably is galvanized. The outer or receiving end of the pipe 4 is provided with a band of brass 6 or other metal of a character which when it contacts with the iron or steel of a delivery spout such as 5 will not result in the production of a spark. The band 6 completely encircles the exterior of the receiving end portion of the said pipe.

The opposite or delivery end of the pipe is curved or of arc shape as shown and it is provided also with a band 7 of brass or other metal which when it strikes against the metal of a receptacle such as the tank 2 will not result in the production of a spark. The band 7 completely encircles the delivery end portion of the pipe 2. As a further protection to prevent contact of the iron or steel of the pipe 4 with the iron or steel of a receptacle, such as the tank 2, I have provided strips 8 and 9 of brass or other metal which is soft as compared with iron or steel which are adapted to contact with the metal of the receiving receptacles such as the tank 2 and thereby, as it were, protect the pipe 4. These strips also serve as a stiffening and strengthening means to hold the pipe against bending or distortion. One of these strips 8 is located upon the concave side of the delivery end portion of the pipe 4, while the other strip 9 is located upon the convex side thereof as is clearly shown in the drawings. Additional strips may be employed if deemed desirable. Upon reference to Fig. 1 of the drawings it will be apparent that the presence of the band 7 and the strips 8 and 9 upon the delivery end portion of the pipe 4 will operate to prevent contact of the iron or steel of the said pipe with the iron or steel of the tank 2.

It will be seen that by my invention I have provided a pipe employed for the delivery of gasoline or other inflammable fluid to a receptacle, such as a tank, with means for preventing the accidental production of a spark. By so doing I greatly increase the factor of safety in the handling of inflammable fluids such as gasoline.

Having thus described my invention what I claim and desire to secure by Letters Patent is:

1. As an article of manufacture, a pipe of suitable length for the delivery of an inflammable fluid to a receptacle, the opposite end portions of said pipe being protected by a covering of metal which is relatively soft as compared with the metal of the receptacle.

2. As an article of manufacture, a pipe for the delivery of inflammable fluid from a source of supply to a receptacle, the said pipe consisting of sheet iron, steel or other suitable metal and having at its delivery end an encircling band of metal other than iron or steel and being relatively soft as compared with iron or steel and also having at its delivery end strips of metal similar to that of the said band, the forward ends of which terminate in adjoining relation to the said band and the rear ends thereof extending back to points a substantial distance from the said delivery end.

3. As an article of manufacture, a sheet metal pipe of suitable length for the delivery of inflammable fluid from a source of supply to a receptacle, the delivery end portion of the said pipe being of arc shape and the said pipe being provided at each of its ends with an encircling band of a metal relatively soft as compared with the metal of the receptacle and the delivery end portion of said pipe also being provided with strips of metal relatively soft as compared with the metal of the receptacle, the forward ends of which terminate in adjoining relation to the band at the delivery end of the said pipe and the rear ends of which terminate at points a substantial distance in rear of the said delivery end, one of the said strips being bent and secured in contact relation with the concave side of the delivery end portion of the said pipe while the other of said strips is bent and is secured in contact relation with the convex side of the delivery end portion of the said pipe.

4. As an article of manufacture, a pipe of sheet iron or steel of suitable length for the delivery of inflammable fluid such as gasoline from a source of supply to a receptacle, such as a tank, each end of said pipe being encircled by a band of brass, the delivery end portion being of arc shape and the said delivery end portion being provided with strips of brass the forward ends of which terminate in adjoining relation to the encircling brass band at said end while the rear end portions thereof terminate at points a substantial distance from the said rear end, one of said strips being bent and secured to the said pipe in contact relation to the concave side of said delivery end portion and the other of said strips being bent and secured in contact relation to the convex side of the said delivery end portion.

5. As an article of manufacture, a pipe of suitable length for the delivery of an inflammable fluid to a metallic receptacle, said pipe being protected by a covering of metal which is relatively soft as compared with the metal of the receptacle.

6. As an article of manufacture, a metallic pipe for the delivery of inflammable fluid from a source of supply to a metallic receptacle, said pipe having means on the delivery end thereof to prevent the production of a spark by contact of said end with said receptacle, comprising strips of metal relatively soft as compared with the metal of the receptacle, the forward ends of said strips terminating adjacent the delivery end of said pipe and the rear ends of said strips terminating a substantial distance from said delivery end.

In testimony that I claim the foregoing as my invention I have hereunto signed my name this 24th day of March, A. D., 1931.

ELMER F. MILLIKEN.